(12) United States Patent
Miao et al.

(10) Patent No.: US 12,526,614 B2
(45) Date of Patent: Jan. 13, 2026

(54) METHODS FOR COMMUNICATION, TERMINAL DEVICE, NETWORK DEVICE, AND COMPUTER READABLE MEDIA

(71) Applicant: NEC CORPORATION, Tokyo (JP)

(72) Inventors: Zhaobang Miao, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 484 days.

(21) Appl. No.: 17/925,215

(22) PCT Filed: May 15, 2020

(86) PCT No.: PCT/CN2020/090667
§ 371 (c)(1),
(2) Date: Nov. 14, 2022

(87) PCT Pub. No.: WO2021/227072
PCT Pub. Date: Nov. 18, 2021

(65) Prior Publication Data
US 2023/0232201 A1 Jul. 20, 2023

(51) Int. Cl.
*H04W 8/00* (2009.01)
*H04W 24/08* (2009.01)
*H04W 72/25* (2023.01)

(52) U.S. Cl.
CPC .......... *H04W 8/005* (2013.01); *H04W 24/08* (2013.01); *H04W 72/25* (2023.01)

(58) Field of Classification Search
CPC ...... H04W 8/005; H04W 24/08; H04W 72/25
See application file for complete search history.

(56) References Cited

U.S. PATENT DOCUMENTS

2017/0027009 A1   1/2017   Dumpala et al.
2018/0054237 A1   2/2018   Tseng et al.
(Continued)

FOREIGN PATENT DOCUMENTS

CN    107771410 A    3/2018
CN    110611940 A   12/2019
(Continued)

OTHER PUBLICATIONS

Extended European Search Report dated Jun. 6, 2023 in Application No. 20935243.4.
(Continued)

*Primary Examiner* — Kevin C. Harper
(74) *Attorney, Agent, or Firm* — Sughrue Mion, PLLC (57) ABSTRACT

Embodiments of the present disclosure provide for sidelink communications. In a method for communications, a first terminal device receives information about an identity related to a relay feature of at least one second terminal device via a sidelink channel. The first terminal device determines a relay terminal device of the first terminal device based on the information about the identity. Embodiments of the present disclosure provides a more flexible and feasible communication mechanism for relay discovery and selection without requirements for a specific resource pool for sidelink discovery or performing cyclic redundancy check on resources of the sidelink channel. The identity dedicated to the relay feature can not only be used to distinguish different terminal devices but also enable the terminal device to determine whether they are to be discovered as a candidate relay terminal device by the remote terminal device, and thereby enhancing the relay discovery and selection procedure.

20 Claims, 4 Drawing Sheets

(56) References Cited

U.S. PATENT DOCUMENTS

| | | |
|---|---|---|
| 2018/0123682 A1 | 5/2018 | Jung et al. |
| 2018/0249516 A1* | 8/2018 | Jung .................... H04W 76/11 |
| 2018/0287866 A1 | 10/2018 | Yoon |
| 2020/0100167 A1 | 3/2020 | Cheng et al. |
| 2021/0051500 A1* | 2/2021 | Chae .................... H04L 5/0048 |

FOREIGN PATENT DOCUMENTS

| | | |
|---|---|---|
| EP | 3 609 259 A1 | 2/2020 |
| EP | 3 618 555 A1 | 3/2020 |
| WO | 2016/159000 A1 | 10/2016 |
| WO | 2020/033086 A1 | 2/2020 |

OTHER PUBLICATIONS

Samsung, "Feature lead summary for agenda item 7.2.4.1 Physical layer structure for sidelink", 3GPP TSG RAN WG1 #96bis Meeting, R1-1905632, Apr. 8-12, 2019, pp. 1-19, Xi'an, China.
Written Opinion for PCT/CN2020/090667, dated Feb. 18, 2021.
International Search Report for PCT/CN2020/090667, dated Feb. 18, 2021.
JP Office Communication for JP Application No. 2022-569475, mailed on Oct. 24, 2023 with English Translation.
Ericsson, "PHY layer structure for NR sidelink", 3GPP TSG-RAN WG1 #98 R1-1908911, Aug. 16, 2019, pp. 1-pp. 20.

* cited by examiner

METHODS FOR COMMUNICATION, TERMINAL DEVICE, NETWORK DEVICE, AND COMPUTER READABLE MEDIA

CROSS REFERENCE TO RELATED APPLICATIONS

This application is a National Stage of International Application No. PCT/CN2020/090667 filed May 15, 2020.

FIELD

Embodiments of the present disclosure generally relate to the field of communication, and more particularly, to a method for communication, a terminal device, a network device and computer readable media.

BACKGROUND

In device-to-device (D2D) communications, terminal devices, for example, User Equipment (IE), are allowed to communicate with each other over a direct link instead of routing traffic over a core network, such as the Evolved Packet Core (EPC). Generally, the D2D communications may involve discovery, direct communication and UE-to-network or UE-to-UE relay procedures. Discovery is a procedure that identifies terminal devices that are in proximity with each other. Direct communication is a procedure where the terminal device in proximity is able to communicate using local radio resources. UE-to-network or UE-to-UE relay procedures is a procedure where one terminal device (referred to as a relay terminal device) can relay traffic from another terminal device (referred to as a remote terminal device) to the network or to still another terminal device, and vice versa. For example, if a remote terminal device is outside of the coverage area of the network device, such as a base station of the network, then the UE-to-network relay procedure allows the remote terminal device to transmit traffic to the relay terminal device that is in the coverage area of the network device through a direct communication. The relay terminal device in turn forwards the traffic from the remote terminal device to the network by communicating with the network device.

As one of the key technologies for the fifth generation mobile communication system, also referred to new radio (NR) technology, vehicle to everything (V2X) technologies can be based on D2D communication technologies such as the sidelink communication technology. As compared with the traditional cellular network, the NR communication system is modified and upgraded in terms of components, control plane, data plane, resource allocation, channel design, and the like. Therefore, there is a demand of a more flexible communication mechanism of sidelink discovery and relay selection adaptive to the application scenarios in 5G communication system.

SUMMARY

In general, example embodiments of the present disclosure provide a solution of relay discovery and selection.

In a first aspect, there is provided a method for communications. The method comprises receiving, at a first terminal device, information about an identity related to a relay feature of at least one second terminal device via a sidelink channel. The method further comprises determining a relay terminal device of the first terminal device based on the information about the identity.

In a second aspect, there is provided a method for communications. The method comprises determining, at a network device, an identity related to a relay feature of a second terminal device served by the network device, the identity being used for a sidelink communication. The method also comprises transmitting the identity to the second terminal device via a signaling.

In a third aspect, there is provided a method for communications. The method comprises receiving, at a second terminal device and from a network device, an identity related to a relay feature of the second terminal device. The method also comprises transmitting, on a sidelink channel, information about the identity to a first terminal device.

In a fourth aspect, there is provided a terminal device. The network device comprises a processor and a memory storing instructions. The memory and the instructions are configured, with the processor, to cause the terminal device to perform the method according to the first aspect.

In a fifth aspect, there is provided a network device. The terminal device comprises a processor and a memory storing instructions. The memory and the instructions are configured, with the processor, to cause the network device to perform the method according to the second aspect.

In a sixth aspect, there is provided a terminal device. The network device comprises a processor and a memory storing instructions. The memory and the instructions are configured, with the processor, to cause the terminal device to perform the method according to the third aspect.

In a seventh aspect, there is provided a computer readable medium having instructions stored thereon. The instructions, when executed on at least one processor of a device, cause the device to perform the method according to the first aspect.

In an eighth aspect, there is provided a computer readable medium having instructions stored thereon. The instructions, when executed on at least one processor of a device, cause the device to perform the method according to the second aspect.

In a ninth aspect, there is provided a computer readable medium having instructions stored thereon. The instructions, when executed on at least one processor of a device, cause the device to perform the method according to the third aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar elements.

DETAILED DESCRIPTION OF EMBODIMENTS

Principles of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" or "base station" (BS) refers to a device which is capable of providing or hosting a cell or coverage where terminal devices can perform communications. Examples of a network device include, but not limited to, a Node B (NodeB or NB), an Evolved NodeB (eNodeB or eNB), a next generation NodeB (gNB), an infrastructure device for a V2X (vehicle-to-everything) communication, a Transmission/Reception Point (TRP), a Remote Radio Unit (RRU), a radio head (RH), a remote radio head (RRH), a low power node such as a femto node, a pico node, and the like.

As used herein, the term "terminal device" or "user equipment" (UE) refers to any device having wireless or wired communication capabilities. The communications may involve transmitting and/or receiving wireless signals using electromagnetic signals, radio waves, infrared signals, and/or other types of signals suitable for conveying information over air. Examples of the terminal device include, but not limited to, mobile phones, cellular phones, smart phones, personal computers, desktops, personal digital assistants (PDAs), portable computers, image capture devices such as digital cameras, gaming devices, music storage and playback appliances, pressure sensors, humidity sensors, thermometers, motion sensors, accelerometers, actuators, smart watches, rings, eHealth related devices, Internet appliances enabling wireless or wired Internet access and browsing, vehicle-mounted terminal devices, devices of pedestrians, roadside units, and the like. For the purpose of discussion, in the following, some embodiments will be described with reference to UEs as examples of terminal devices and the terms "terminal device" and "user equipment" (UE) may be used interchangeably in the context of the present disclosure.

In some embodiments, a terminal device may be connected with a first network device and a second network device. One of the first network device and the second network device may be a master node and the other one may be a secondary node. The first network device and the second network device may use different radio access technologies (RATs). In some embodiments, the first network device may be a first RAT device and the second network device may be a second RAT device. In some embodiments, the first RAT device is an eNB and the second RAT device is a gNB. Information related to different RATs may be transmitted to the terminal device from at least one of the first network device and the second network device. In some embodiments, first information may be transmitted to the terminal device from the first network device and second information may be transmitted to the terminal device from the second network device directly or via the first network device. In some embodiments, information related to configuration for the terminal device configured by the second network device may be transmitted from the second network device via the first network device. Information related to reconfiguration for the terminal device configured by the second network device may be transmitted to the terminal device from the second network device directly or via the first network device.

As used herein, the term "transmission reception point," "transmission/reception point," or "transmission and reception point" may generally indicate a station communicating with the user equipment. However, the transmission and reception point may be referred to as different terms such as a base station (BS), a cell, a Node-B, an evolved Node-B (eNB), a next generation NodeB (gNB), a Transmission Reception Point (TRP), a sector, a site, a base transceiver system (BTS), an access point (AP), a relay node (RN), a remote radio head (RRH), a radio unit (RU), an antenna, and the like.

That is, in the context of the present disclosure, the transmission and reception point, the base station (BS), or the cell may be construed as an inclusive concept indicating a portion of an area or a function covered by a base station controller (BSC) in code division multiple access (CDMA), a Node-B in WCDMA, an eNB or a sector (a site) in LTE, a gNB or a TRP in NR, and the like. Accordingly, a concept of the transmission and reception point, the base station (BS), and/or the cell may include a variety of coverage areas such as a mega-cell, a macro-cell, a micro-cell, a pico-cell, a femto-cell, and the like. Furthermore, such concept may include a communication range of the relay node (RN), the remote radio head (RRH), or the radio unit (RU).

In the context of the present disclosure, the user equipment and the transmission/reception point may be two transmission/reception subjects, having an inclusive meaning, which are used to embody the technology and the technical concept disclosed herein, and may not be limited to a specific term or word. Furthermore, the user equipment and the transmission/reception point may be uplink or downlink transmission/reception subjects, having an inclusive meaning, which are used to embody the technology and the technical concept disclosed in connection with the present disclosure, and may not be limited to a specific term or word. As used herein, an uplink (UL) transmission/reception is a scheme in which data is transmitted from user equipment to a base station. Alternatively, a downlink (DL) transmission/reception is a scheme in which data is transmitted from the base station to the user equipment.

As used herein, the term "resource," "transmission resource," "resource block," "physical resource block," "uplink resource," or "downlink resource" may refer to any resource for performing a communication, for example, a communication between a terminal device and a network device, such as a resource in time domain, a resource in frequency domain, a resource in space domain, a resource in code domain, or any other resource enabling a communication, and the like. In the following, a resource in both frequency domain and time domain will be used as an example of a transmission resource for describing some embodiments of the present disclosure. It is noted that embodiments of the present disclosure are equally applicable to other resources in other domains.

As used herein, the singular forms "a," "an" and "the" are intended to include the plural forms as well, unless the context clearly indicates otherwise. The term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment."

As used herein, the terms "first", "second" and the like may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

Depending on whether terminal devices are within coverage of the network device, there are three kind of relaying scenario, i.e., in-coverage relaying, partial out-of-coverage relaying and entire out-of-coverage relaying. Regardless of the relaying scenarios, the remote terminal device typically searches and selects a relay terminal device based on certain rules or criteria. For example, the remote terminal device may measure reference signals transmitted from one or more candidate relay terminal device so as to evaluate a quality of a link between the remote terminal device and a corresponding candidate relay terminal device. At least one of the candidate relay terminal devices with a good link quality may then be determined to be the relay terminal device for relaying traffic of the remote terminal device.

Figure 1:
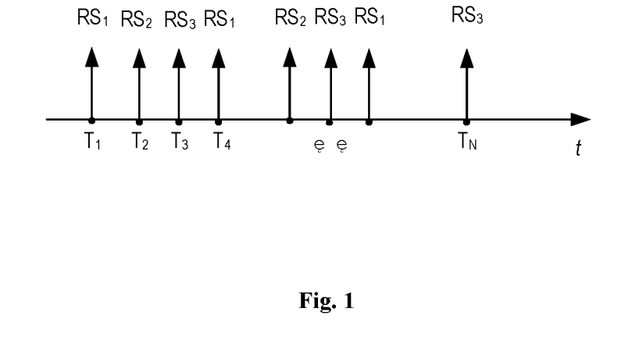
FIG. 1 is a schematic diagram of relay discovery in sidelink communications.

FIG. 1 is a schematic diagram of relay discovery in sidelink communications. As shown in FIG. 1, the remote terminal device detects a plurality of reference signals transmitted from different candidate relay terminal devices on a physical sidelink discovery channel in a plurality of measurement occasions $T_1$ to $T_N$. In order to evaluate the link quality, the remote terminal device measures and filters the sidelink reference signal receiving power (e.g., SD-RSRP) or reference signal receiving quality (RSRQ) of a reference signal associated with the same proximity service (ProSe) relay terminal device identity, denoted as $RS_1$ $RS_2 \ldots RS_n$.

The SD-RSRP is defined as a linear average over the power contributions of the resource elements that carry demodulation reference signals associated with the PSDCH. In the current communication system, the remote terminal device decodes the received reference signal on the PSDCH resources.

However, only when a cyclic redundancy check is validated and an identity of the candidate relay terminal device identity is detected can the remote terminal device perform the subsequent measurement on the PSDCH. This is because for resources on which no signals are transmitted, only noise may be measured on. Therefore, in current D2D communications, whether a signal is present is determined by checking whether a CRC is passed so as to more accurately measure a DMRS of a corresponding resource. Even D2D signals of different UEs may be filtered (averaged) if a CRC is passed. To prevent this phenomenon, filtering (averaging) may be performed with respect to packets having the same UE ID (the same physical layer or higher layer ID) in a state in which a CRC is passed. In the same context, when the D2D RSRP or D2D RSRQ is measured, a corresponding measurement value may be included in an input value for filtering (averaging) only when the D2D RSRP is above a predetermined threshold. That is, when a terminal device measures the RSRP, RSRQ or RSSI of DMRS, the terminal device first performs decoding and, only when a CRC is passed and a specific ID is detected, the terminal device stores a corresponding measurement value only with respect to the specific ID. Next, only when the same ID is detected, the terminal device may update the measurement value (or average the measurement value or include the measurement value in an input value).

In addition, E-UTRAN supports dedicated resource pool for sidelink discovery on the PSDCH. Neither PSDCH nor SD-RSRP is applicable for measurement of link quality and relay selection in the NR network architecture.

In order to solve the above technical problem and other potential technical problems in conventional solutions, example embodiments of the present disclosure provide a solution for sidelink discovery and relay selection. The solution involves a flexible channel design that can be implemented on more than one sidelink channels and carry an identity related to the relay feature of the candidate relay terminal device. Such an identity can be obtained without performing CRC on resources of the sidelink channel and thus facilitating the relay discovery and selection procedure. The solution also provides a configurable relay feature for the candidate relay terminal device. In particular, the candidate relay terminal device may inform the remote terminal device of the relay feature being supported or not via the identity.

Figure 2:
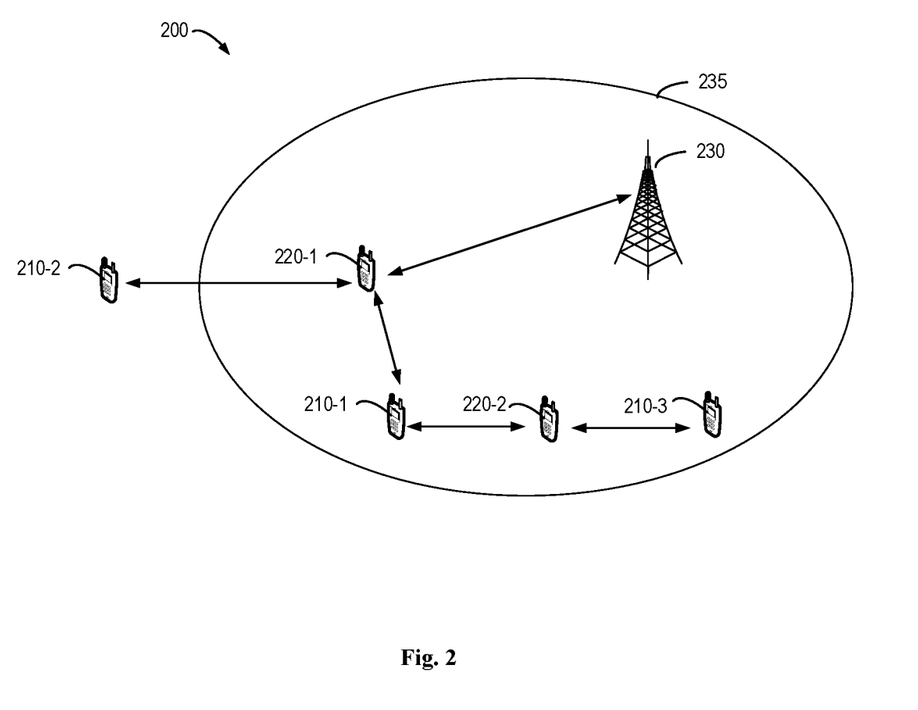
FIG. 2 is a schematic diagram of a communication environment in which some embodiments of the present disclosure can be implemented.

FIG. 2 shows an example environment 200 in which example embodiments of the present disclosure can be implemented. As shown in FIG. 2, the communication environment 200, which may be a part of a communication network, includes a network device 230 hosted a cell 235 and first terminal devices 210-1, 210-3, 220-1 and 220-2 located in the coverage of the cell 235, as well as a second terminal device 210-2 located out of the coverage of the cell 235. In particular, the second terminal device 220-1 may communicate with the network device 230 via a communication channel. For transmissions from the network device 230 to the second terminal device 220-1, the communication channel may be referred to as a downlink (DL) channel, whereas for transmissions from the second terminal device 220-1 to the network device 230, the communication channel may alternatively be referred to as an uplink (UL) channel.

The first terminal devices 210-1 and 210-2 may act as remote terminal devices, while the second terminal device 220-1 and 220-2 may act as relay terminal devices. For example, the UE-to-network relay procedure may be implemented among the first terminal device 210-2, the second terminal device 220-1 and the network device 230. The UE-to-UE relay procedure may be implemented among the first terminal devices 210-1 and 210-3 and the second terminal device 220-2. In addition, for the first terminal device 210, more than one relay terminal devices, namely, the second terminal devices 220-1 and 220-2, may be selected as the relay terminal devices. In this case, the relay link between the remote terminal device 210 and the relay terminal device 220 may be a PC5 link.

It is to be understood that "the first terminal device 210" and "the remote terminal device 210", as well as "the second terminal device 220" and "the candidate relay terminal device 220" may be used interchangeably in the context of the present disclosure the number. It is also to be understood that the first terminal device 210 and the second terminal device 220, as well as the number of the network device 230 as shown in FIG. 2 are only for the purpose of illustration without suggesting any limitations. The communication environment 200 may include any suitable number of terminal devices, any suitable number of network devices, and any suitable number of other communication devices adapted for implementing embodiments of the present disclosure.

In addition, it would be appreciated that there may be various wireless communications as well as wireline communications (if needed) among all the communication devices. Moreover, it is noted that although the network device 230 is schematically depicted as a base station and the first terminal device 210 and the second terminal device 220 are schematically depicted as a mobile phone in FIG. 2, it is understood that these depictions are only for example without suggesting any limitation. In other embodiments, the network device 230 may be any other wireless network device, and the first and second terminal devices 210 and 220 may be any other wireless communication device.

The communications in the communication environment 200 may conform to any suitable standards including, but not limited to, Global System for Mobile Communications (GSM), Extended Coverage Global System for Mobile Internet of Things (EC-GSM-IoT), Long Term Evolution (LTE), LTE-Evolution, LTE-Advanced (LTE-A), Wideband Code Division Multiple Access (WCDMA), Code Division Multiple Access (CDMA), GSM EDGE Radio Access Network (GERAN), and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

Figure 3:
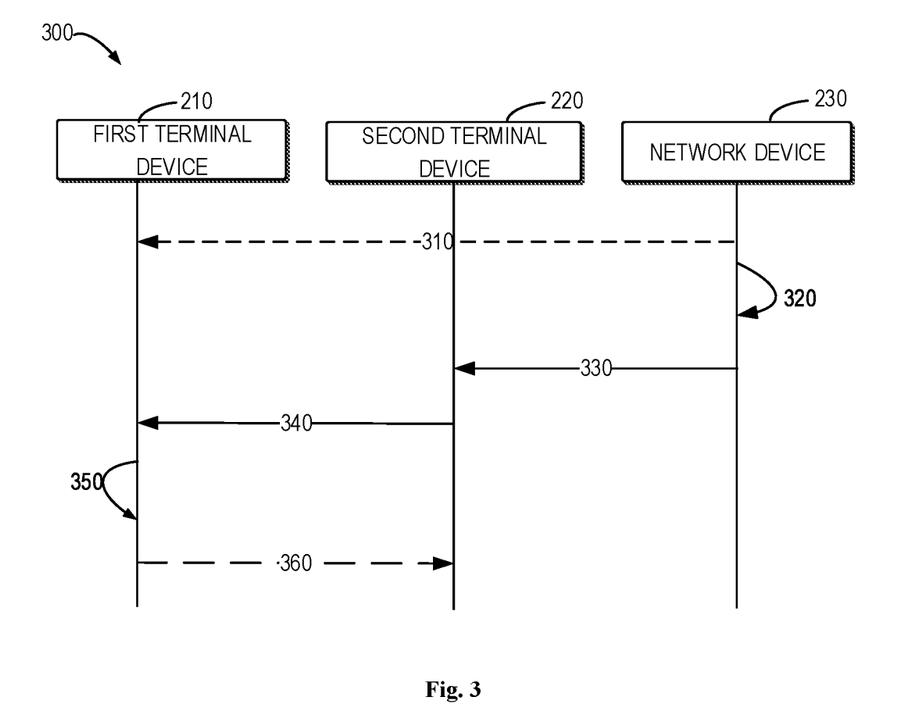
FIG. 3 illustrates an example signaling chart showing an example process for sidelink communications in accordance with some embodiments of the present disclosure.

FIG. 3 illustrates an example signaling chart showing an example process for resource coordination in accordance with some embodiments of the present disclosure. As shown in FIG. 3, the process 300 may involve the first terminal device 210, the second terminal device 220 and the network device 230 as shown in FIG. 2. It is to be understood that the process 300 may include additional acts not shown and/or may omit some acts as shown, and the scope of the present disclosure is not limited in this regard. In addition, it will be appreciated that, although primarily presented herein as being performed serially, at least a portion of the acts of the process 300 may be performed contemporaneously or in a different order than as presented in FIG. 3.

As shown in FIG. 3, the network device 230 transmits 310 an indicator to the first terminal device 210 via a higher layer signaling. The indicator may indicate whether a relay feature of the candidate relay terminal device, for example, the second terminal device 220 is configurable. In some embodiments, the transmission of the indicator is optional, for example, in absence of such an indicator, the first terminal device 210 may determine that the relay feature is mandatory for the second terminal device 220.

The network device 230 determines 320 the identity related to the relay feature of the second terminal device 220 served by the network device 230. Unlike the unique identification of the terminal device, the identity related to the relay feature is specific to the sidelink communication for facilitating relay discovery and selection. This will be discussed below in details.

The network device 230 transmits 330 the identity to the second terminal device 220 via a higher layer signaling. For example, the network device 230 may transmit identities to the candidate relay terminal devices within its coverage.

The second terminal device 220 receives from the network device 230 the identity related to the relay feature. In some cases where the identity is predefined for the candidate relay terminal device, such as an out-of-coverage terminal device, the receipt of the identity is not essential and may be omitted. The second terminal device 220 transmits 340 the identity to the first terminal device 210 on a sidelink channel. The sidelink channel may be selected from at least one of a Physical Sidelink Control Channel (PSCCH), a Physical Sidelink Shared Channel (PSSCH), and a Physical Sidelink Broadcast Channel (PSBCH). This will be discussed below in details.

Upon receiving the information, the first terminal device 210 determines 350 a result of the relay terminal device of the first terminal device based at least in part on the information about the identity. The determination of the result may be further based on a measurement result of at least one reference signal received on the sidelink channel. The result may indicate that at least one of the candidate relay terminal devices are to be the relay terminal device. In this case, the first terminal device 210 may establish 360 the relay connection with the relay terminal device, for example, the terminal devices 220-1 and 220-2. Alternatively, the result may indicate that none of the candidate relay terminal device is to be the relay terminal device and the relay selection procedure may be repeated until a relay terminal device is determined.

In this way, both the remote terminal device and the relay terminal device can benefit from the simplified and feasible relay discovery and selection procedure. The identity dedicated to the relay feature can not only be used to distinguish different terminal devices but also enable the terminal device to determine whether they are to be discovered as a candidate relay terminal device by the remote terminal device.

Figure 4:
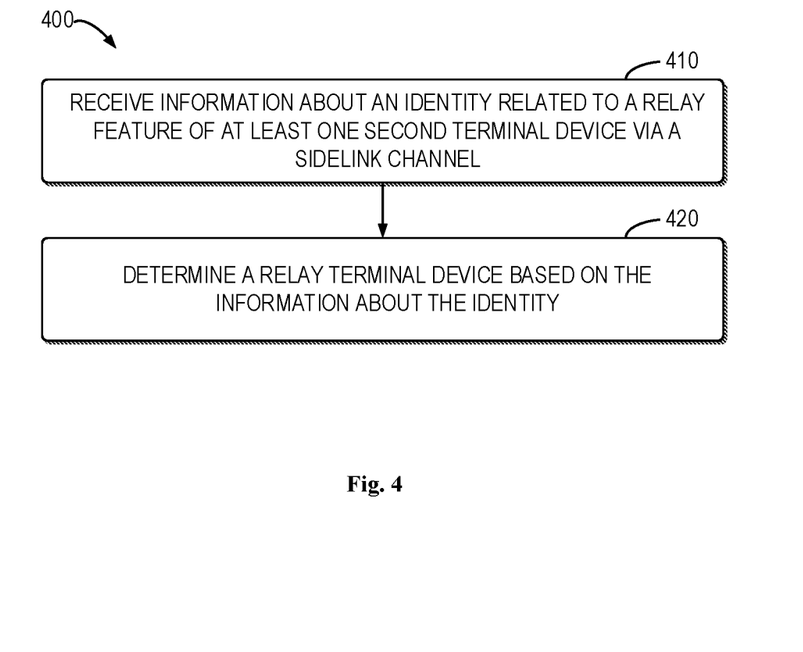
FIG. 4 illustrates a flowchart of an example method in accordance with some embodiments of the present disclosure.

FIG. 4 illustrates a flowchart of an example method 400 in accordance with some embodiments of the present disclosure. In some embodiments, the method 400 can be implemented at a terminal device, such as the first terminal devices 210-1 and 210-2 as shown in FIG. 2. Additionally or alternatively, the method 400 can also be implemented at other terminal devices not shown in FIG. 2. For the purpose of discussion, the method 400 will be described with reference to FIG. 2 as performed by the first terminal device 210 without loss of generality.

At block 410, the first terminal device 210 receives information about the identity related to the relay feature of at least one terminal device via a sidelink channel. The sidelink channel may be selected from a group including at least one of Physical Sidelink Control Channel (PSCCH), a Physical Sidelink Shared Channel (PSSCH), and a Physical Sidelink Broadcast Channel (PSBCH). The identity related to the relay feature may be configured by the network for the in-coverage terminal device and predefined for the out-of-coverage terminal device. As mentioned above, the identity is specific to the sidelink communication for facilitating relay discovery and selection procedure. The identity may be indicated by at least one of a field specific to the identity, a source identity, and a combination of the source identity and a zone identity included in the sidelink control information (SCI), and a field of a sidelink synchronization signal block (S-SSB) depending on the sidelink channel. This will be discussed below in details.

The SCI may include two stages, i.e., the first stage SCI and the second stage SCI, represented as SCI 1-X and SCI 2-X, with X referring to different types. In the context of the present disclosure, the terms "the first stage SCI format" and "SCI format 1" as well as "the second stage SCI format" and "SCI format 2" may be used interchangeably. In particular, the first stage SCI format is used for the scheduling of PSSCH and the second stage SCI on PSSCH. The second stage SCI format is used for the decoding of PSSCH.

In some embodiments, the sidelink channel may be the PSCCH. Since the second terminal device 220 may transmit data transmissions on the PSCCH, and in this case the sidelink control information (SCI) format 1 (including at least format1-A) may be used for carrying the information about the identity. For purpose of discussion, the following description refers to SCI format 1-A. It would be appreciated that the configuration of the identity may be equally applicable to all the first stage SCI formats. The first terminal device 210 obtains the identity from a field of the SCI format 1-A. The table 1-1 shows at least part of information included in the SCI format 1-A. As shown in table 1-1, the identity may be indicated by at least one reserved bit in the field. Alternatively, the identity may be indicated by at least one bit in an additional field add to the SCI format 1-A, which could also be regarded as a new SCI format not shown, with the additional field being specific to the identity. The first terminal device 210 may measure the reference signal to evaluate the link quality based on the location of the reference signal, such as DMRS, which will be discussed below in detail.

TABLE 1-1

| SCI format 1-A | |
|---|---|
| Field | Size |
| Priority | 3 bits |
| Frequency resource assignment | variable |
| Time resource assignment | 5 bits or 9 bits |
| Resource reservation period | variable |
| DMRS pattern | undetermined |
| The second stage SCI format | undetermined |
| Beta_offset indicator | 2 bits |
| Number of DMRS port | 1 bit |
| Modulation and coding scheme (MCS) | 5 bits |
| Additional MCS table indicator | 0-2 bits |
| Reserved | 2-4 bits |

In some embodiments, the sidelink channel may be the PSSCH. Analogous to PSCCH, the second terminal device 220 may transmit data transmissions on the PSSCH, and in this case, the SCI format 2 (at least including format 2-A and 2-B) may be used for carrying the information about the identity. The first terminal device 210 obtains the identity from the SCI format 2. For example, the identity may be indicated by a source identity included in a source field of the SCI format 2-A. As another example, the identity may be indicated by a combination of the source identity and a zone identity included in a zone field of the SCI format 2-B, such as, in the form of "source ID+zone ID" or "zone ID+source ID". Alternatively, the identity may be indicated by at least one bit in an additional field add to the SCI format 2-A or format 2-B, which could also be regarded as a new SCI format, with the additional field being specific to the identity. In some cases, the first terminal device 210 may first receive the SCI format 1-A to obtain resource assignment information, which indicates the resources on which SCI Format 2-A and 2-B is transmitted. In addition, the SCI format 1-A may also indicate a location of the reference signal to be transmitted on the PSSCH, such as the DMRS, for example, from the fields of "Frequency resource assignment" and "Time resource assignment." The first terminal device 210 may measure the reference signal to evaluate the link quality based on the location of the reference signal, such as DMRS, which will be discussed below in detail. The tables 1-2 and 1-3 show at least part of information included in the SCI formats 2-A and 2-B, respectively.

TABLE 1-2

| SCI format 2-A | |
|---|---|
| Field | Size |
| HARQ Process ID | undetermined |
| New data indicator | 1 bit |
| Redundancy version | 2 bits |
| Source ID | 8 bits |
| Destination ID | 16 bits |
| CSI request | 1 bit |

TABLE 1-3

| SCI format 2-B | |
|---|---|
| Field | Size |
| HARQ Process ID | undetermined |
| New data indicator | 1 bit |
| Redundancy version | 2 bits |
| Source ID | 8 bits |
| Destination ID | 16 bits |
| Zone ID | 12 bits |
| Communication range requirement | 4 bit |

In some embodiments, the sidelink channel may be the PSBCH. In this case, the sidelink synchronization signal block (S-SSB) to be transmitted on the PSBCH may be used for carrying the information about the identity. The first terminal device 210 receives the S-SSB and obtains the identity included in the S-SSB. For example, the identity may be indicated by at least one reserved bit in the SSB.

In order to learn the link quality associated with respective candidate relay terminal devices which are identified by the identity, the first terminal device 210 may perform measurement of at least one reference signal received from the second terminal device 220. In particular, the first terminal device 210 may measure the DMRS received from the second terminal devices 220-1 and 220-2, and determine the measurement result based on the measured parameter, such as RSRP or RSRQ or RSSI (RSRP or RSRQ is preferred) of the DMRS. The measurement result may be helpful to subsequently select the relay terminal device.

As described above, the relay feature may or may not be configurable by the second terminal device 220. In a case where the relay feature is not configurable, the relay feature is assumed to be provided by each of the second terminal devices 220 with the identity related to relay feature, the first terminal device 210 may obtain the measurement result of the at least one reference signal. In a case where the relay feature is configurable by the second terminal device 220, the first terminal device 210 may first determine whether the relay feature is supported by the second terminal device 220 based on the information about the identity. If the relay feature is determined to be supported, the first terminal device may obtain the measurement result of the at least one reference signal received from the second terminal device 220.

In some embodiments, after obtaining the measured parameter RSRP or RSRP of the DMRS transmitted from respective second terminal device 220, the first terminal device 210 may compare the value of the measured parameter with a first threshold value M. If the value of the measured parameter is less than the first threshold value M, the corresponding second terminal device 220 may be determined to be an ignored terminal device due to its poor link quality. The first terminal device may no longer measure the reference signals transmitted from the ignored terminal device. For example, according to a measurement result, the RSRP of the DMRS of the second terminal device 220-1 exceeds the first threshold value M dBm, while the RSRP of the DMRS of the second terminal device 220-2 does not exceed the first threshold value M dBm. In this case, the second terminal device 220-2 may be determined to be the ignored terminal device that is not suitable as a relay terminal device.

In some embodiments, the first terminal device 210 may update the measurement result by filtering the measured parameter, such as RSRP, RSRQ or RSSI, with an average filter or a layer 3 filter configured with a predetermined filter coefficient. The filter input may be every measurement result or every i measurement results of the reference signal associated with the same identity. In some cases, the first terminal device 210 may filter the measurement results that have values exceeding a second threshold value N dBm.

In some embodiments, the first terminal device 210 may measure the at least one reference signal with a certain time gap, for example a predetermined minimum time gap. In other embodiments, the first terminal device 210 may measure the at least one reference signal once it detects the transmission on the sidelink channel.

Continuing with reference to FIG. 2, at block 420, the first terminal device 210 determines a result of the relay terminal device of the first terminal device based on the information about the identity. For example, the result may indicate that one or more terminal devices 220 of the candidate relay terminal devices are to be the relay terminal device. In this case, the remote terminal device 210 may establish the relay connection with the relay terminal device, for example, the second terminal devices 220-1 and 220-2.

In some embodiments, the first terminal device 210 may determine the result of the relay terminal device based on the information about the identity and the measurement result. For example, based on the measurement result of the reference signal from the candidate relay terminal device, the first terminal device 210 may determine one or more second terminal devices 220 that have the top/link qualities to be the relay terminal device. Alternatively, the first terminal device 210 may determine the second terminal device 220 that has a measurement result indicative of the value of the measured parameter exceeds a third threshold value F dBm to be the relay terminal device. The present disclosure is not limited to this aspect.

The first terminal device 210 may then establish a relay connection with the relay terminal device, either directly or by transmitting a connection request via an RRC signaling. In this embodiment, after establishing the relay connection, the first terminal device 210 may continuously measure the RSRP, RSRQ or RSSI from the relay terminal device so as to monitor the link quality between the second terminal device 220 and the first terminal device 210. If the measurement result indicates that the link quality is poor, for example, the value of RSRP, RSRQ or RSSI is below a preconfigured threshold value k dBm, the first terminal device 210 may determine that the second terminal device 220 might be suitable for relaying, and the relay (re-)selection procedure may be repeated. In this case, the first terminal device 210 may search and select a terminal device other than the second terminal device to be the relay terminal device.

In a case where neither the second terminal device 220-1 nor the second terminal device 220-2 are suitable for relaying, for example, the link qualities of both the terminal devices 220-1 and 220-2 are below the predetermined threshold value, the result may indicate that the relay terminal device is to be selected from candidate relay terminal devices other than the terminal devices 220-1 and 220-2, and the relay selection procedure may be performed again.

The first terminal device 210 may act as a terminal device for sharing the identity related to the relay feature of candidate relay terminal devices to other terminal devices. For example, the first terminal device 210 may share the information with other terminal devices within a preconfigured range in terms of the coordinate distance or the radio distance (e.g., pathloss) between the first terminal device 210 and the other terminal device. The first terminal device 210 may transmit a message including the identity for reporting the candidate terminal devices via a radio resource control (RRC) signaling. The message may be transmitted based on the higher layer configuration of the first terminal device 210, or alternatively, in response to a request from the other terminal devices. The report period or the occasion for transmitting the message for reporting may be configured by a higher layer of the first terminal device 210. In some embodiments, the message also includes the measurement result of the RSRP/RSRQ.

Figure 5:
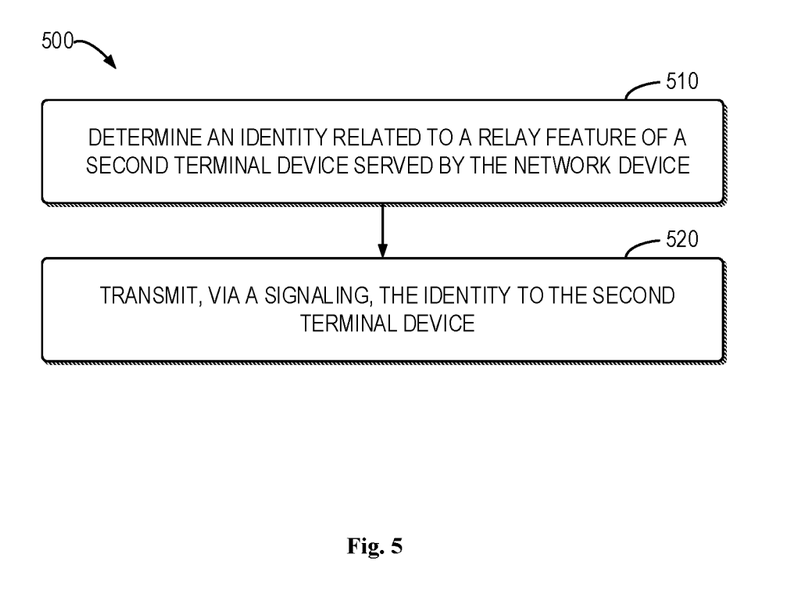
FIG. 5 illustrates a flowchart of another example method in accordance with some embodiments of the present disclosure.

FIG. 5 illustrates a flowchart of another example method 500 in accordance with some embodiments of the present disclosure. In some embodiments, the method 500 can be implemented at a network device, such as the network device 230 as shown in FIG. 2. Additionally or alternatively, the method 500 can also be implemented at other network devices not shown in FIG. 2. For the purpose of discussion, the method 500 will be described with reference to FIG. 2 as performed by the network device 230 without loss of generality.

At block 510, the network device 230 determines the identity related to the relay feature of the second terminal device 220 served by the network device 230. The identity may be used for a sidelink communication, for example, specific to the relay discovery and selection procedure. In some embodiments, the relay feature may be mandatory for the candidate relay terminal device, the value of the identity related to the relay feature may be used to identify the candidate relay terminal device. In other embodiments, the relay feature may not be mandatory for the candidate relay terminal device, and a specific value of the identity, such as, the value of "0000" may indicate the relay feature is deactivated or not supported, while the values other than the specific value may be used to identify the candidate relay terminal device.

At block 520, the network device 230 transmits the identity to the second terminal device 220 via a higher layer signaling. For example, the network device 230 may transmit identities to the candidate relay terminal devices within its coverage. In some embodiments, the network device 230 may transmit an indicator indicating that whether a relay feature is configurable by the second terminal device 220 to the first terminal device 210 via a higher layer signaling.

Figure 6:
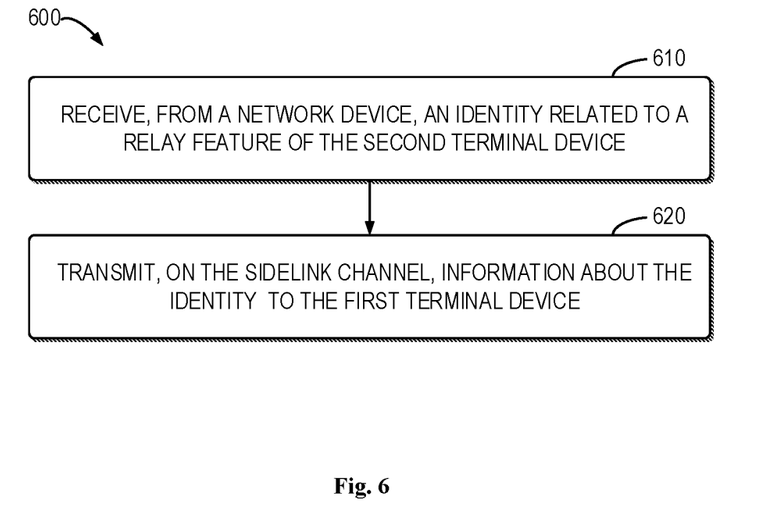
FIG. 6 illustrates a flowchart of a further example method in accordance with some embodiments of the present disclosure.

FIG. 6 illustrates a flowchart of another example method 600 in accordance with some embodiments of the present disclosure. In some embodiments, the method 600 can be implemented at a terminal device, such as the second terminal devices 220-1 and 220-2 as shown in FIG. 2. Additionally or alternatively, the method 600 can also be implemented at other terminal devices not shown in FIG. 2. For the purpose of discussion, the method 600 will be described with reference to FIG. 2 as performed by the second terminal device 220 without loss of generality.

At block 610, the second terminal device 220 receives from the network device 230 an identity related to a relay feature of the second terminal device 220. As described above, the identity may be configured by a higher layer signaling.

At block 620, the second terminal device 220 transmits information about the identity to the first terminal device 210 on the sidelink channel. The sidelink channel may be selected from at least one of a Physical Sidelink Control Channel (PSCCH), a Physical Sidelink Shared Channel (PSSCH), and a Physical Sidelink Broadcast Channel (PSBCH).

In a case where the sidelink channel is the PSCCH, the second terminal device 220 may transmit the information about the identity by means of the SCI. In some embodiments, the second terminal device 220 generates sidelink control information (SCI) including the identity. The SCI may be one of SCI formats 1-A, and at least one bit in a field of the SCI may be configured to indicate the identity or a new first stage SCI format including at least one field may indicate the identity. For example, the identity may be indicated by 2 to 4 reserved information bits in the SCI format 1-A or an additional field added to the SCI. The second terminal device 220 may then transmit the SCI on the PSCCH.

In a case where the sidelink channel is the PSSCH, the second terminal device 220 may transmit the information about the identity by means of the SCI. In some embodiments, the second terminal device 220 generates the SCI including the identity. The SCI may be a SCI format 2-A including a source field and SCI format 2-B including a source field and a zone field. For example, the identity may be indicated by a source identity included in the source field of SCI format2-A or SCI format 2-B. In another example, the identity may be indicated by a combination of the source identity and the zone identity included in the zone field of SCI format 2-B, such as, in the form of "source ID+zone ID" or "zone ID+source ID". The second terminal device 220 may then transmit the SCI on the PSSCH.

In a case where the sidelink channel is the PSBCH, the second terminal device 220 may transmit the information about the identity by means of the synchronization signal block (SSB). In some embodiments, the second terminal device 220 generates the SSB including the identity. The identity is indicated by at least one reserved bit in the SSB. The second terminal device 220 may then transmit the SSB on the PSBCH.

In some embodiments, the relay feature may be mandatory for the candidate relay terminal device, and the value of the identity related to the relay feature is used to identify the candidate relay terminal device 220. In other embodiments, the relay feature is optional for the candidate relay terminal device. In this case, the identity related to the relay feature is configurable for the second terminal device 220, regardless of whether the identity is preconfigured or predefined. For example, the second terminal device 220 may not expect to be a relay terminal device and establish the relay connection with the other terminal devices. The second terminal device 220 determines to deactivate or disable the relay feature, and configure the identity with a specific value, for example, "0000", to indicate that the relay feature is not to be supported. The values other than the specific value may be used to identify the candidate relay terminal device 220.

Figure 7:
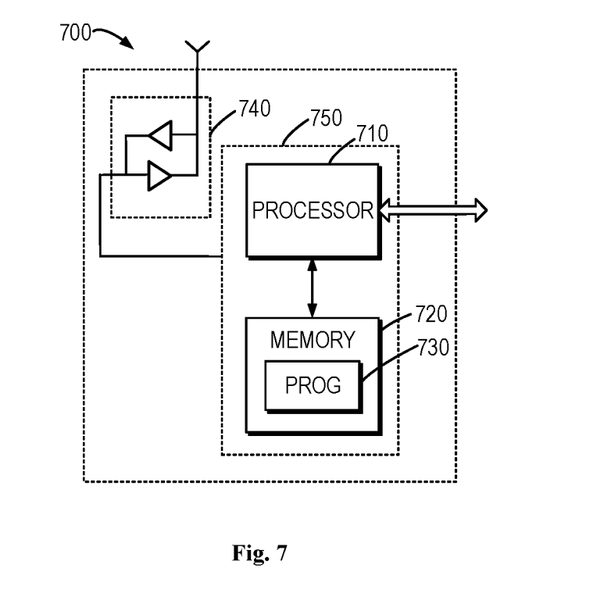
FIG. 7 is a simplified block diagram of a device that is suitable for implementing some embodiments of the present disclosure.

FIG. 7 is a simplified block diagram of a device 700 that is suitable for implementing some embodiments of the present disclosure. The device 700 can be considered as a further example embodiment of the first terminal device 210, the second terminal device 220 and the network device 230 as shown in FIG. 2. Accordingly, the device 700 can be implemented at or as at least a part of the first terminal device 210, the second terminal device 220 and the network device 230.

As shown, the device 700 includes a processor 710, a memory 720 coupled to the processor 710, a suitable transmitter (TX) and receiver (RX) 740 coupled to the processor 710, and a communication interface coupled to the TX/RX 740. The memory 720 stores at least a part of a program 730. The TX/RX 740 is for bidirectional communications. The TX/RX 740 has at least one antenna to facilitate communication, though in practice an Access Node mentioned in this application may have several ones. The communication interface may represent any interface that is necessary for communication with other network elements, such as X2 interface for bidirectional communications between gNBs or eNBs, S1 interface for communication between a Mobility Management Entity (MME)/Serving Gateway (S-GW) and the gNB or eNB, Un interface for communication between the gNB or eNB and a relay node (RN), or Uu interface for communication between the gNB or eNB and a terminal device.

The program 730 is assumed to include program instructions that, when executed by the associated processor 710, enable the device 700 to operate in accordance with the embodiments of the present disclosure, as discussed herein with reference to any of FIGS. 4-6. The embodiments herein may be implemented by computer software executable by the processor 710 of the device 700, or by hardware, or by a combination of software and hardware. The processor 710 may be configured to implement various embodiments of the present disclosure. Furthermore, a combination of the processor 710 and memory 720 may form processing means 750 adapted to implement various embodiments of the present disclosure.

The memory 720 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 720 is shown in the device 700, there may be several physically distinct memory modules in the device 700. The processor 710 may be of any type suitable to the local technical network, and may include one or more of general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

The components included in the apparatuses and/or devices of the present disclosure may be implemented in various manners, including software, hardware, firmware, or any combination thereof. In some embodiments, one or more units may be implemented using software and/or firmware, for example, machine-executable instructions stored on the storage medium. In addition to or instead of machine-executable instructions, parts or all of the units in the apparatuses and/or devices may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to any of FIGS. 3-6. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific embodiment details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first terminal device communicating with a network via a relay terminal device, the first terminal device comprising:
one or more memories storing instructions; and
one or more processors configured to process the instructions to control the first terminal device to:
receive a first format of sidelink control information (SCI) being used for a scheduling of a physical sidelink shared channel (PSSCH) and a scheduling of a second format of a SCI on the PSSCH,
receive the second format of the SCI on the PSSCH, the second format of the SCI being different from the first format of the SCI, the second format of the SCI comprising an identity of each of one or more candidate relay terminal devices, and the identity being indicated by a source identity,
select a second terminal device as the relay terminal device from the one or more candidate relay terminal devices based on a measurement result of a reference signal of each of the one or more candidate relay terminal devices and the identity of each of the one or more candidate relay terminal devices comprised in the second format of the SCI, and
establish a communication with the network via the second terminal device.

2. The first terminal device according to claim 1, wherein a sidelink channel is selected from a group comprising at least one of the following: a Physical Sidelink Control Channel (PSCCH), a Physical Sidelink Shared Channel (PSSCH), and a Physical Sidelink Broadcast Channel (PSBCH).

3. The first terminal device according to claim 1, wherein the identity is indicated by at least one of:
a source identity comprised in sidelink control information;
a combination of the source identity and a zone identity comprised in the sidelink control information;
a field of the sidelink control information specific to the identity; and
a field of the system synchronization block specific to the identity.

4. The first terminal device according to claim 1, wherein the one or more processors are configured to further process the instructions to control the first terminal device to obtain the measurement result of the reference signal received from the one or more candidate relay terminal devices.

5. The first terminal device according to claim 1, wherein the one or more processors are configured to further process the instructions to control the first terminal device:
measure the reference signal received from the one or more candidate relay terminal devices; and
determine the measurement result based on a measured parameter of the reference signal.

6. The first terminal device according to claim 5, wherein the one or more processors are configured to further process the instructions to control the first terminal device to:
measure the reference signal, received from the one or more candidate relay terminal devices, in response to a detection of a transmission on a sidelink channel, and
measure the reference signal with a predetermined time gap.

7. The first terminal device according to claim 5, wherein the one or more processors are configured to further process the instructions to control the first terminal device to determine the measurement result by layer 3 filtering the measured parameter associated with the same identity.

8. The first terminal device according to claim 5, wherein in a case where the measurement result of the second terminal device is below a threshold value,
the one or more processors are configured to further process the instructions to control the first terminal device to select a third terminal device as the relay terminal device among the one or more candidate relay terminal devices, and
establish a communication with the network via the third terminal device.

9. The first terminal device according to claim 5, wherein the reference signal is a DeModulation Reference Signal (DMRS), and
the measured parameter is a Sidelink Discovery Reference Signal Received Power (SD-RSRP).

10. A method for a first terminal device communicating with a network via a relay terminal device, the method comprising:
receiving a first format of sidelink control information (SCI) being used for a scheduling of a physical sidelink shared channel (PSSCH) and a scheduling of a second format of SCI on the PSSCH,
receiving the second format of the SCI on the PSSCH, the second format of the SCI being different from the first format of the SCI, the second format of the SCI comprising an identity of each of one or more candidate relay terminal devices, and the identity being indicated by a source identity,
selecting a second terminal device as the relay terminal device from the one or more candidate relay terminal devices based on a measurement result of a reference signal of each of the one or more candidate relay terminal devices and the identity of each of the one or more candidate relay terminal devices comprised in the second format of the SCI, and
establishing a communication with the network via the second terminal device.

11. The method according to claim 10, wherein a sidelink channel is selected from a group comprising at least one of the following: a Physical Sidelink Control Channel (PSCCH), a Physical Sidelink Shared Channel (PSSCH), and a Physical Sidelink Broadcast Channel (PSBCH).

12. The method according to claim 10, wherein the identity is indicated by at least one of:
a source identity comprised in sidelink control information;
a combination of the source identity and a zone identity comprised in the sidelink control information;
a field of the sidelink control information specific to the identity; and
a field of the system synchronization block specific to the identity.

13. The method according to claim 10, wherein the method further comprises:
obtaining the measurement result of the reference signal received from the one or more candidate relay terminal devices.

14. The method according to claim 10, wherein the method further comprises:
measuring the reference signal received from the one or more candidate relay terminal devices; and
determining the measurement result based on a measured parameter of the reference signal.

15. The method according to claim 14, wherein the method further comprises:
measuring the one reference signal, received from the one or more candidate relay terminal devices, in response to a detection of a transmission on a sidelink channel, and
measuring the reference signal with a predetermined time gap.

16. The method according to claim 14, wherein the method further comprises:
determining the measurement result by layer 3 filtering the measured parameter associated with the same identity.

17. The method according to claim 14, wherein in a case where the measurement result of the second terminal device is below a threshold value, and
wherein the method further comprises:
selecting a third terminal device as the relay terminal device among the one or more candidate relay terminal devices, and
establishing a communication with the network via the third terminal device.

18. The method according to claim 14, wherein the reference signal is a DeModulation Reference Signal (DMRS), and the measured parameter is a Sidelink Discovery Reference Signal Received Power (SD-RSRP).

19. The first terminal device according to claim 1, wherein the identity of the one or more candidate relay terminal devices comprises a source identity.

20. The method according to claim 10, wherein the identity of the one or more candidate relay terminal devices comprises a source identity.

* * * * *